United States Patent [19]

Lamb

[11] Patent Number: 5,202,539
[45] Date of Patent: Apr. 13, 1993

[54] EMERGENCY BRAKE APPARATUS FOR AN ELEVATOR

[75] Inventor: Miles P. Lamb, Bedminster, N.J.

[73] Assignee: Inventio AG, Hergiswil, Switzerland

[21] Appl. No.: 751,089

[22] Filed: Aug. 28, 1991

[51] Int. Cl.$^5$ ............................................. B66B 5/02
[52] U.S. Cl. ...................................... 187/109; 187/89; 187/108; 188/180
[58] Field of Search .................. 187/108, 109, 110, 38, 187/39, 73, 89; 188/31, 265, 166, 170, 180

[56] References Cited

U.S. PATENT DOCUMENTS

| | | | |
|---|---|---|---|
| 2,822,603 | 2/1958 | Ball | 187/170 |
| 3,848,716 | 11/1974 | Hanning | 187/170 |
| 3,966,027 | 6/1976 | Plitzkow | 188/182 |
| 4,257,494 | 3/1981 | Frankel | 187/89 |
| 4,923,055 | 5/1990 | Holland | 187/109 |
| 4,977,982 | 12/1990 | Bialy et al. | 187/89 |
| 5,002,158 | 3/1991 | Ericson et al. | 187/39 |
| 5,007,505 | 4/1991 | Lindegger | 187/89 |
| 5,020,640 | 6/1991 | Nederbragt | 187/89 |
| 5,133,201 | 7/1992 | LaMott | 188/265 |

FOREIGN PATENT DOCUMENTS

| | | | |
|---|---|---|---|
| 0154196 | 11/1953 | Australia | 188/180 |
| 0385180 | 9/1990 | European Pat. Off. | |
| 2857376 | 7/1979 | Fed. Rep. of Germany. | |
| 0376614 | 5/1973 | U.S.S.R. | 188/265 |
| 1118399 | 7/1968 | United Kingdom. | |

*Primary Examiner*—Steven L. Stephan
*Assistant Examiner*—Thomas M. Dougherty
*Attorney, Agent, or Firm*—Sandler, Greenblum & Bernstein

[57] ABSTRACT

An additional emergency brake apparatus is provided for an elevator installation which contains a car, counterweight, hoist ropes, drive sheave, motor, brake and elevator car safety. This additional emergency brake apparatus acts directly at the drive sheave and is intended to accomplish emergency braking in the upward direction of travel of the car, because in this travel direction the elevator car safety cannot be used for a number of reasons. A star-shaped brake element located at the shaft of the drive sheave is permanently pressed by a cup spring against an annular end surface of the drive sheave and normally rotates together with the shaft of the drive sheave. In the event of overspeed in the upward travel direction of the car, a tripping mechanism displaces an arresting bolt between the spokes of the star-shaped brake element, blocks the latter and thus produces an appropriate braking torque by means of braking plates bearing at the annular end surface. This braking torque can be greater by an order of magnitude than the braking torque which can be produced with the normal operating brake.

9 Claims, 3 Drawing Sheets

EMERGENCY BRAKE APPARATUS FOR AN ELEVATOR

BACKGROUND OF THE INVENTION

1. Field of the Invention

The present invention relates to a new and improved emergency brake apparatus for an elevator, especially a traction elevator containing a car, counterweight, hoist ropes, drive sheave, brake, motor, elevator car safety as well as this additional emergency brake which acts directly at the drive sheave.

2. Discussion of the Background and Material Information

An elevator installation of the aforementioned type possesses the previously mentioned elevator car safety in the form of a rail safety which, in the presence of overspeed or excessive velocity of the elevator in the down direction, is tripped by a mechanical velocity limiter. During the running of the elevator, the normal operating brake serves as holding brake and upon response of a contact located in a safety circuit this operating brake can initiate an emergency stop in both travel directions of the elevator.

With the view of satisfying more stringent safety requirements and stricter safety codes which may possibly be enacted in the future, the need exists for an additional brake apparatus which functions independently of prevailing brake apparatuses and becomes active prior to the rail safety. This additional brake apparatus should specifically bring about a controlled and reproducible emergency braking action in the up-travel direction of the elevator. On the one hand, braking of the upward travelling elevator should not exceed a deceleration of 1 "g", but, on the other hand, should allow for a deceleration of, for example, 5 to 7 m/sec². The operating brake is unsuited for this purpose, because with driving load, namely, a full car in the down-travel direction and an empty car in the up-travel direction, there is only still possible a deceleration of slightly more than 1 m/sec². On the other hand, with the rail safety there are attained decelerations greater than 1 "g", so that such is not used in the up-travel direction because of rope slack and other effects. Additionally, the release of an actuated rail safety is associated with considerable expense, such as typically the need to rework the rails at the engaged location of the safety.

In U.S. Pat. No. 4,923,055, granted May 8, 1990, entitled "Safety Mechanism for Preventing Unintended Motion in Traction Elevators", there is described a solution where brake levers equipped with brake shoes and which are pre-biased by a spring are arranged to both sides of the end faces of the drive sheave. These brake levers together with their brake shoes are laterally pressed by a trigger mechanism against the end faces of the drive sheave, resulting in an appropriate braking action. The triggering action is indirectly accomplished by a solenoid or electromagnet which releases an entrainment lever or trigger which is then engaged and actuated by a radial boss of the drive sheave. Thereafter there is eliminated the mechanical latching of the still open emergency brake and the brake levers engage the drive sheave with a force governed by the pre-biased spring and exert a braking action upon the elevator car. This safety mechanism is designed as a structural addition to the elevator installation and contains many components, and after tripping of the safety mechanism it must be manually reset into its preparatory or ready state.

U.S. Pat. No. 4,977,982, granted Dec. 18, 1990, entitled "Elevator Sheave Brake Safety" and U.S. Pat. No. 5,007,505, granted Apr. 16, 1991, entitled "Elevator Safety", each disclose an emergency brake apparatus wherein brake elements are tangentially guided towards the drive or traction sheave, and apart from a spring pre-bias there comes into play a mechanical servo-action due to the entrainment effect. It is very difficult to reproduce a defined braking torque. Furthermore, both of these prior art emergency brakes are designed as retrofitted structures.

SUMMARY OF THE INVENTION

Therefore, with the foregoing in mind, it is a primary object of the present invention to provide an improved emergency brake apparatus which is not afflicted with the aforementioned drawbacks and limitations of the prior art.

Another and more specific object of the present invention aims to provide an improved emergency brake apparatus which is constructionally fully integrated into the drive system, reproduces a defined braking torque, possesses relatively few parts, and can be reset by a control into its preparatory or ready state.

Now in order to implement these and still further objects of the present invention, which will become more readily apparent as the description proceeds, the emergency brake apparatus of the present development is manifested, among other things, by the features that there is provided a brake element in the form of a brake star which is continuously pressed under spring load against an end surface or face of a drive sheave and normally rotates in conjunction therewith. Additionally, an axially displaceable arresting element in the form of, for example, an arresting bolt, when engaging with the brake star, blocks such brake star and thus produces a braking torque.

According to a further feature, the star-like or spoked brake element comprises a hub which is axially displaceable upon a shaft of the drive sheave, radially arranged spokes and brake pads or plates bearing against the end surface constituted by an annular end surface of the drive sheave.

Still further, a tripping mechanism is secured to a bearing block and axially moves the arresting bolt. This tripping mechanism comprises a solenoid, a compression spring cooperating with the arresting bolt and sleeve or slide bearings for displaceably mounting the arresting bolt There is advantageously used a cup or disc spring which renders possible the static pressing of the brake star against the annular end surface of the drive sheave. This cup or disc spring is arranged between the hub and a spacer ring or sleeve at the shaft of the drive sheave.

According to a further aspect, the arresting bolt comprises a portion or part which is magnetically conductive and a portion or part which is magnetically non-conductive. Moreover, the arresting bolt comprises a spherically arched end surface, an impact or stop ring and an end impact or stop collar which actuates a switch.

It is further contemplated to provide a mechanical velocity limiter having a work contact which energizes a winding of the solenoid.

According to a further embodiment, the mechanical velocity limiter may comprise a rest contact which serves for deenergizing the winding of the solenoid.

One of the more notable advantages of the present invention resides in the fact that the brake-active part is a component of the drive sheave and already prior to initiation of an emergency braking action bears with the desired brake pressure against a brake surface.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that only enough of the construction of the emergency brake apparatus has been depicted therein, in order to simplify the illustration, as needed for those skilled in the art to readily understand the underlying principles and concepts of the present invention.

Figure 1:
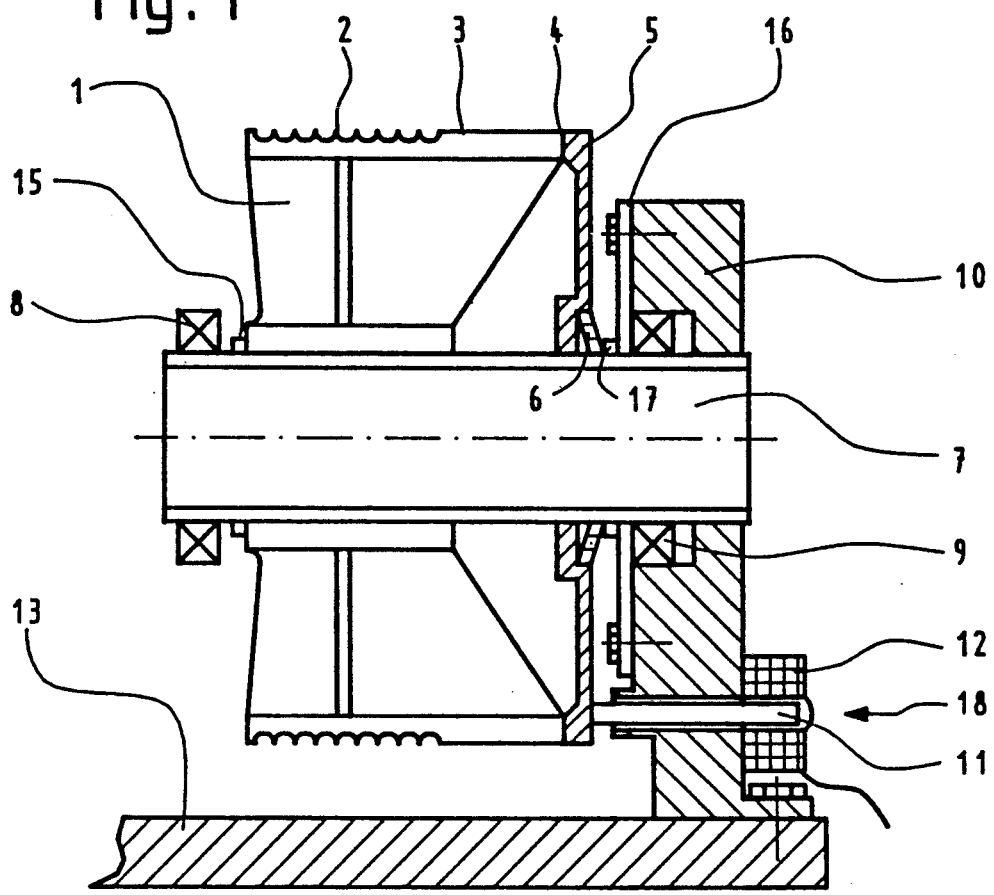
FIG. 1 is a cross-sectional view of an emergency brake apparatus constructed according to the present invention.

Turning attention now specifically to FIG. 1, it will be observed that a drive sheave shaft 7 is rotatably mounted at its opposite ends by roller bearings 8 and 9 or equivalent structure. A drive or traction sheave 1 containing rope grooves 2 and a shoe brake surface 3 is press fitted or otherwise appropriately fixed upon the drive sheave shaft 7 and secured against displacement in the direction of the roller bearing 8 by a stop or impact ring 15. The other roller bearing 9 is arranged in a bearing block 10 and obturated by a bearing cover or closure member 16 which is bolted or otherwise suitably secured at the bearing block 10. This bearing block 10 is mounted at a bed plate 13. A spacer ring or sleeve 17, a pre-biased cup or disc spring 6 and a brake element in the form of a brake star 5 are concentrically arranged at the drive sheave shaft 7 between the bearing cover 16 and the drive sheave 1. The pre-biased cup or disc spring 6 urges the spoked brake element or brake star 5 against an annular end surface or face 4 of the drive sheave 1. A tripping or trigger mechanism 18 for actuating the brake star 5 comprises an arresting element here shown, for example, in the form of an arresting bolt 11 and a solenoid 12.

Figure 2:
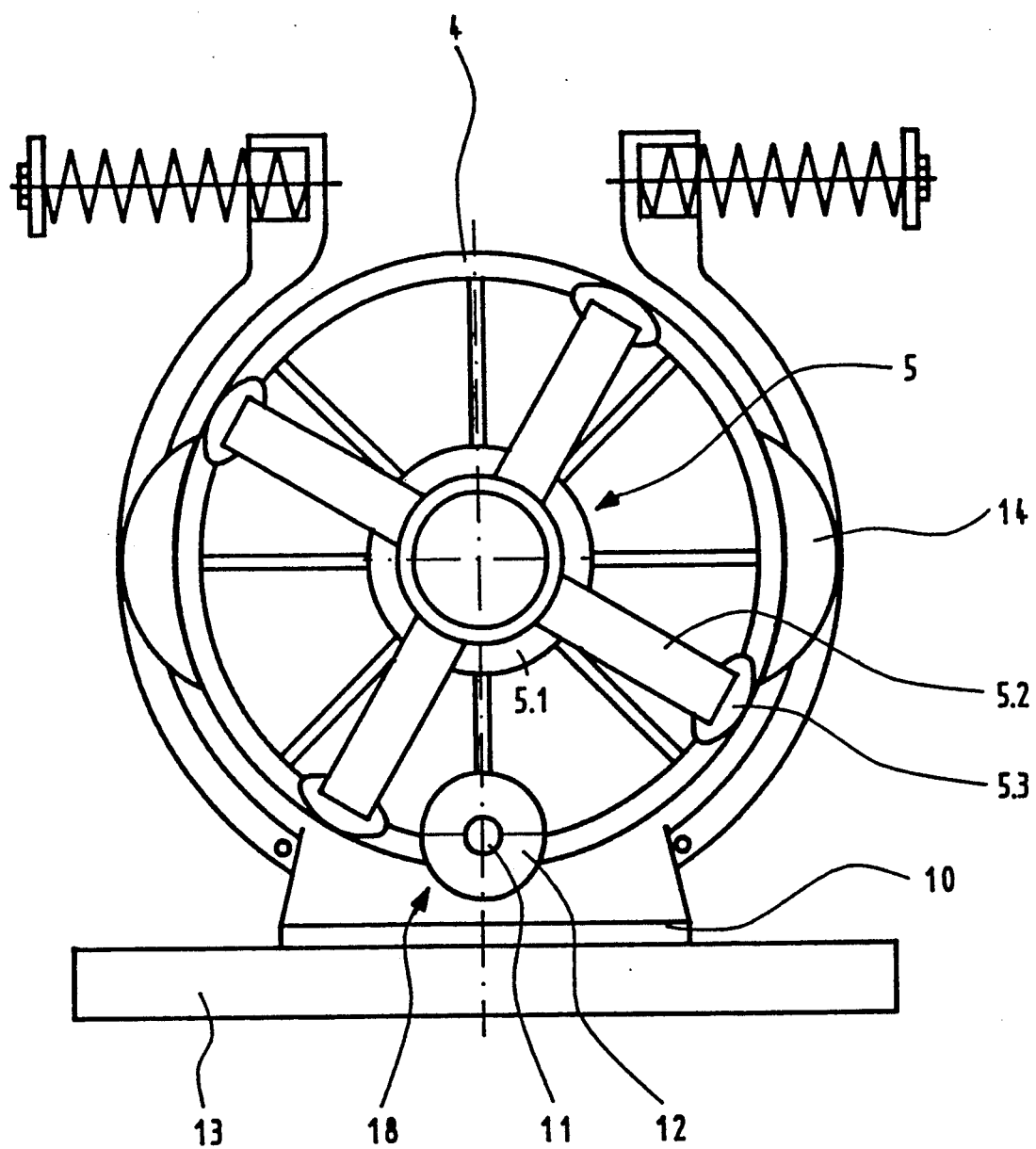
FIG. 2 is an end view of the brake portion of the emergency brake apparatus depicted in FIG. 1.

Considering now FIG. 2, a shoe brake has been conveniently designated by reference numeral 14. The brake star 5 comprises a hub 5.1, radially extending spokes 5.2 and brake plates or pads 5.3 which bear upon the annular end surface or face 4 of the drive sheave 1.

Figure 3:
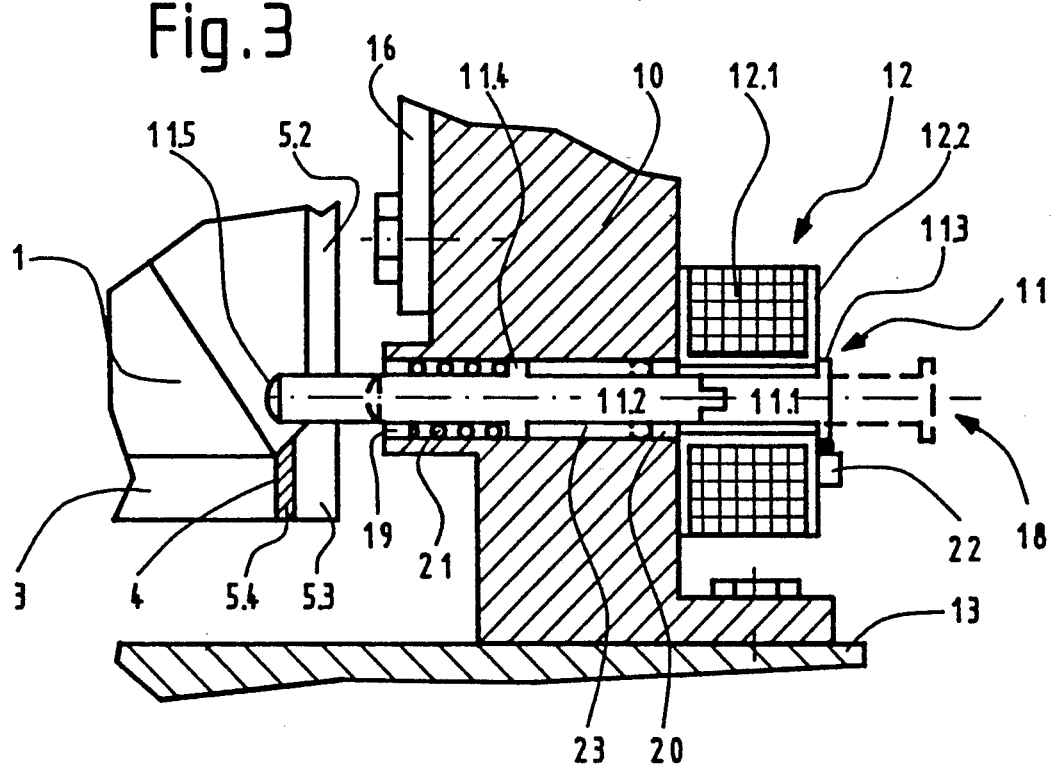
FIG. 3 is an enlarged fragmentary view depicting details of the tripping or trigger mechanism of the emergency brake apparatus depicted in FIG. 1.

Details of the tripping or trigger mechanism 18 have been depicted in FIG. 3. The arresting bolt 11 is mounted to be easily axially displaceable within a bore 23 of the bearing block 10 by means of the sleeve or slide bearings 19 and 20. Here, the arresting bolt 11 comprises a magnetic portion 11.1 located at the right-hand depicted side and a non-magnetic portion 11.2 located at the left-hand depicted side. At the left end of the arresting bolt 11 shown in FIG. 3, the non-magnetic portion 11.2 comprises a spherically arched end surface or face 11.5. The central region of the arresting bolt 11 is provided with an impact or stop ring 11.4 having not particularly referenced impact or stop shoulders at opposite sides thereof. Moreover, the stop ring 11.4 has an outer diameter which is larger than the inner diameter of both of the sleeve bearings 19 and 20, so that this stop ring 11.4 in conjunction with the sleeve bearing 19 forms a support structure for an intermediately arranged compression or pressure spring 21 and in conjunction with the other sleeve bearing 20 forms an end or terminal stop for confining the horizontal sliding movement of the arresting bolt 11.

In the illustration of FIG. 3, the arresting bolt 11 is shown momentarily in cooperative engagement with one of the spokes 5.2 of the brake star 5. In this position of the arresting bolt 11 a winding 12.1 of a coil body 12.2 of the solenoid 12 has been energized, resulting in thrusting insertion of the arresting bolt 11 from the depicted phantom line position into the depicted full position. As a result, the magnetic portion 11.1 shifts to the left of the showing of FIG. 3 until an end stop collar 11.3 or the like located at the right end of the arresting bolt 11 impacts against the coil body 12.2. In this inserted or immersed position of the arresting bolt 11 the end stop collar 11.3 actuates a switch 22 which reports the operational state of the tripping mechanism 18 to a suitable elevator control. The compression spring 21 is arranged between the sleeve bearing 19 and the impact or stop ring 11.4 of the arresting bolt 11 such that in the de-energized state of the solenoid 12 this arresting bolt 11 is retractingly shifted towards the right of the showing of FIG. 3 into its preparatory or ready state depicted in broken lines. Reference numeral 5.4 designates a brake lining secured to the associated brake plate 5.3 and which is pressed against the annular end surface 4 of the drive sheave 1.

Figure 4:
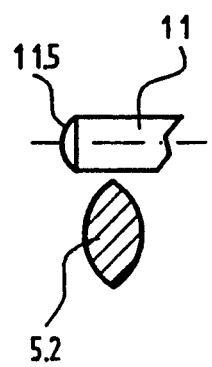
FIG. 4 depicts the arresting bolt of the emergency brake apparatus depicted in FIG. 1 in its engaged position for exerting a braking torque.

FIG. 4 illustrates the cross-sectional configuration of one of the spokes 5.2 of the brake star 5. The depicted substantially teardrop-like spoke cross-section enables the actuated arresting bolt 11 to be reliably inserted into the next intermediate space between two neighboring spokes 5.2 even if the arresting bolt 11 initially fortuitously impacts against one of the spokes 5.2 since such spoke cross-section facilitates sliding off of the abutting arresting bolt into the neighboring intermediate space.

Having had the benefit of the foregoing description of the exemplary embodiment of emergency brake apparatus depicted in FIGS. 1 to 4, there now will be considered the operation thereof which is as follows:

Should an emergency situation arise during upward travel of the elevator, for example, an overspeed of the car because of faulty speed regulation or the like, then the mechanical velocity limiter, which is conventionally provided at the elevator, does not initiate activation of the rail safety provided at the car, however the contact which is actuated by centrifugal elements when there is reached a defined excessive rotational speed is actuated in both rotational directions and can be beneficially employed as an alarm signal transmitter, and the contact output directly or indirectly serves as control signal for the energization of the solenoid 12.

As already discussed with reference to FIG. 3, the arresting bolt 12 comprises a left-hand non-magnetic portion 11.2 and a right-hand magnetic portion 11.1. This magnetic portion 11.1 contains a suitable magnetically conductive material. The material of the other non-magnetic portion 11.2 of the arresting bolt 11 consists of a magnetic non-conducting alloy of increased strength and must be capable of withstanding the static and dynamic loads arising when there is initiated an emergency braking action at the elevator car. During such emergency braking of the elevator car the solenoid 12 is energized and the arresting bolt 11 is thrust between the spokes 5.2 of the brake star 5 and blocks further movement of the latter. The brake linings 5.4 of the brake star 5 rub against the confronting annular end surface 4 of the drive sheave 1 and produce a braking torque which is governed by the pre-bias force exerted by the cup or disc spring 6. As just explained the insertion of the arresting bolt 11 between the spokes 5.2 of the brake star 5 is here perfected electromagnetically by energizing the solenoid 12. The winding 12.1 and the dimensions of the solenoid 12 are designed such that there is only required a relatively small excitation power, so that relative weak control signals can be satisfactorily used.

Figure 5:
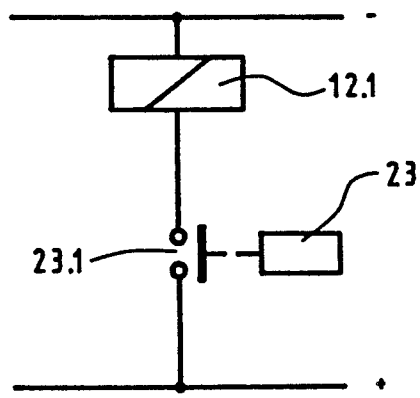
FIG. 5 illustrates a circuit diagram depicting the control of a solenoid by means of a limiter contact and used with the emergency brake apparatus depicted in FIG. 1.

FIG. 5 depicts the circuit principles of such control, wherein reference numeral 23 designates a velocity limiter and reference numeral 23.1 designates a normally-open contact which is actuated by this velocity limiter 23 in order to energize the winding 12.1 of the solenoid 12.

Figure 7:
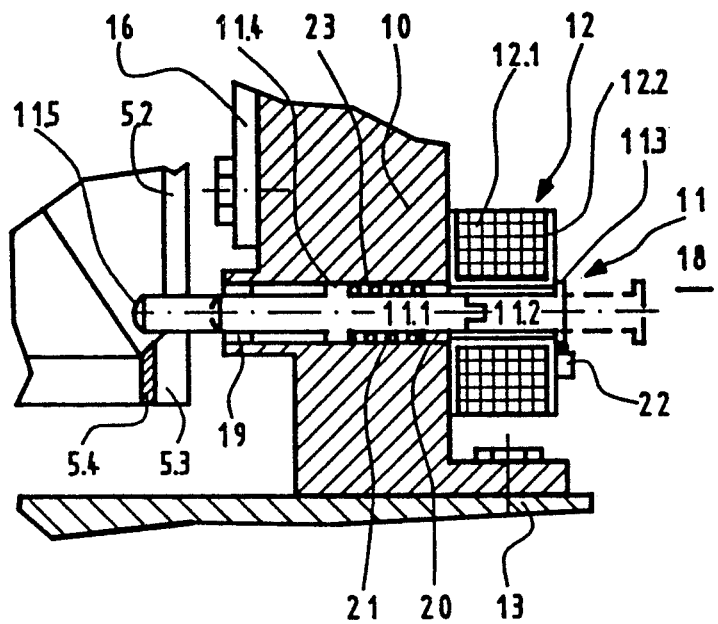
FIG. 7 is an enlarged fragmentary view of a modified version of emergency brake apparatus using a tripping or trigger mechanism which works with quiescent or stand-by current.
Figure 6:
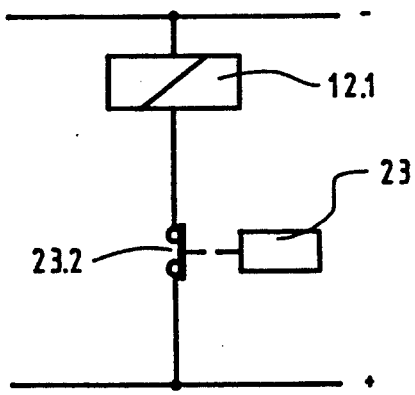
FIG. 6 illustrates a circuit diagram depicting the control of the solenoid by interruption or opening of a safety circuit.

It is to be specifically understood that the control of the winding 12.1 of the solenoid 12 can be, however, undertaken in accordance with the quiescent or standby current principle as shown in FIG. 6. Here, the winding 12 of the solenoid 12 is continuously energized by a normally closed limiter or rest contact 23.2 of the velocity limiter 23, and thus, retains the arresting bolt 11 in its retracted broken line preparatory or ready position as shown for the modified construction of emergency brake apparatus depicted in FIG. 7. In this case the compression or pressure spring 21 is arranged to the right of the impact or stop ring 11.4, and the left-hand portion 11.1 of the arresting bolt 11 is now formed of magnetic material and the right-hand portion 11.2 of non-magnetic material. Just as was the case for the showing of FIG. 3, also in the modified embodiment of FIG. 7 the arresting bolt 11 is depicted in solid lines in a position where it blocks the brake star 5. The control of the winding 12.1 of the solenoid 12 can be additionally accomplished by other signals. Thus, it is desired, for instance, to stop a drifting away or undesired motion of the car when the elevator doors are open at a landing or floor by carrying out an emergency braking in the event that, for some reason, the operating brake is incapable of reliably arresting movement of the elevator car. An appropriate control logic for the winding 12.1 of the solenoid 12 can be devised from a combination of safety- and car position signals.

The release of the emergency brake apparatus after it has been deployed, by retracting the prior actuated arresting bolt 11 back into its starting or preparatory position, can be accomplished by resetting the control contact or contacts to assume their normal operating position and by mechanical load-relief of the arresting bolt 11 by switching-in the car travel direction which relieves the arresting bolt 11. The switch or contact 22 which is operatively mounted at the solenoid 12 signals to the elevator control that the arresting bolt 11 has assumed its preparatory or ready position. The emergency braking apparatus is immediately again ready to undertake its emergency braking operation, and after activation of the emergency braking apparatus there can be explored the cause for such having happened. The principles of the present invention can not only be used with direct or gearless traction elevator installations but also with geared traction elevator installations.

While there are shown and described present preferred embodiments of the invention, it is distinctly to be understood the invention is not limited thereto, but may be otherwise variously embodied and practiced within the scope of the following claims.

What is claimed is:

1. An emergency brake apparatus for an elevator containing a car, counterweight, hoist ropes, drive sheave, brake, motor, and an elevator car safety, comprising:
   a rotatable drive sheave for driving the car;
   the rotatable drive sheave having an end surface;
   a brake element comprising a brake star;
   means for mounting the brake element for conjoint rotational movement with the rotatable drive sheave;
   means for continuously pressing under spring load the brake star against the end surface of the drive sheave;
   an axially displaceable arresting bolt;
   means for axially displacing the axially displaceable arresting bolt for engagement with the brake star; and
   the axially displaceable arresting bolt, when engaging the brake star, blocking rotational movement of the brake star and producing a braking torque at the drive sheave.

2. The emergency braking apparatus according to claim 1, further including:
   a shaft for the drive sheave;
   the end surface of the drive sheave defining an annular end surface; and
   the brake star comprising:
      a hub axially displaceable upon the shaft of the drive sheave;
      radially arranged spokes; and
      brake plates bearing against the annular end surface of the drive sheave.

3. The emergency braking apparatus according to claim further including:
   a bearing block;
   said means for axially displacing the axially displaceable arresting bolt for engagement with the brake star comprises a tripping mechanism mounted at the bearing block; and
   said tripping mechanism comprises:
      a solenoid;

a compression spring cooperating with the arresting bolt; and sleeve bearings for displaceably mounting the arresting bolt.

4. The emergency braking apparatus according to claim 2, wherein:

said means for continuously pressing with spring force the brake star against the end surface of the drive sheave comprises a cup spring;

said cup spring rendering possible static pressing of the brake star against the annular end surface of the drive sheave;

a spacer ring mounted at the shaft of the drive sheave; and said cup spring being arranged between the hub and the spacer ring.

5. The emergency braking apparatus according to claim 1, wherein:

the arresting bolt comprises a magnetically conductive portion and a magnetically non-conductive portion.

6. The emergency braking apparatus according to claim 5, wherein:

the arresting bolt further comprises:
a spherically arched end surface;
an impact ring; and
an end impact collar for actuating a switch.

7. The emergency braking apparatus according to claim 3, wherein:

said solenoid contains a winding; and a mechanical velocity limiter having a work contact which energizes the winding of the solenoid.

8. The emergency braking apparatus according to claim 3, wherein:

said solenoid contains a winding; and a mechanical velocity limiter having a rest contact which de-energizes the winding of the solenoid.

9. An emergency brake apparatus for a traction elevator, comprising:

a rotatable drive sheave for displacing the car;

the rotatable drive sheave having an end surface;

a spoked brake element mounted for conjoint rotational movement with the rotatable drive sheave;

means for continuously pressing under spring load the spoked brake element against the end surface of the drive sheave;

an arresting element;

means for displacing the arresting element into operative braking engagement with the spoked brake element; and the arresting element, when in operative braking engagement with the spoked brake element, blocking rotational movement of the spoked brake element and producing a braking torque at the drive sheave.

* * * * *